F. G. KOEHLER.
SHOCK ABSORBER FOR VEHICLES.
APPLICATION FILED JULY 18, 1907.
944,674.
Patented Dec. 28, 1909.
3 SHEETS—SHEET 1.
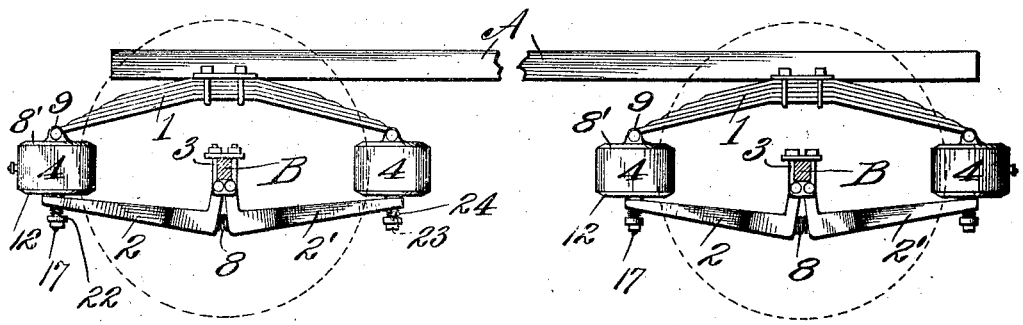
FIG. I.
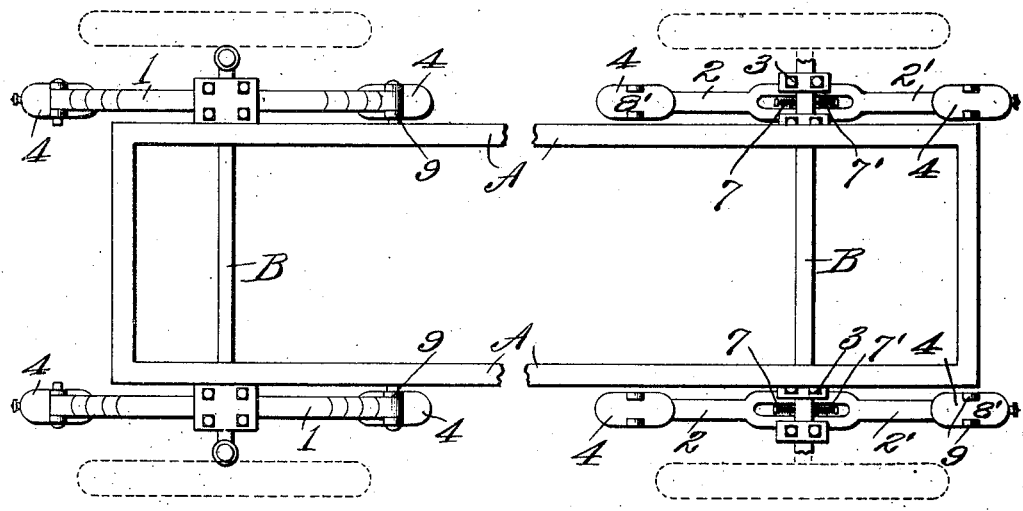
FIG. II.
ATTEST.
INVENTOR.
F. G. Koehler,
BY
ATT'Y.

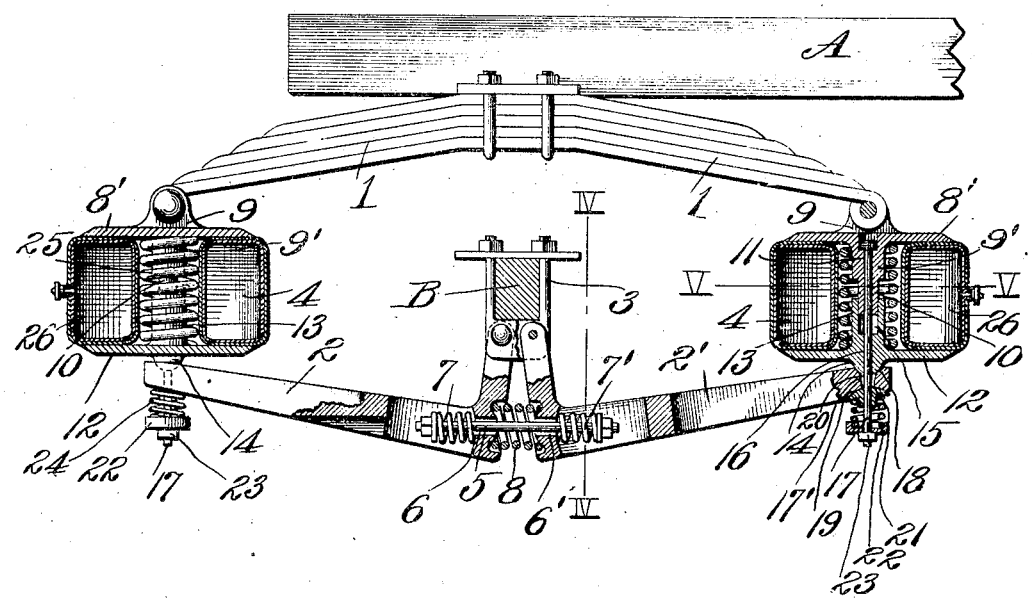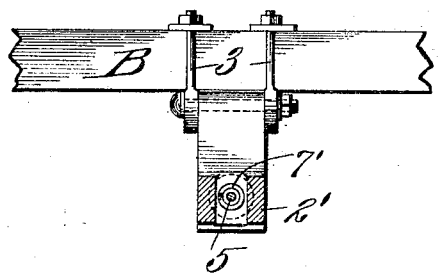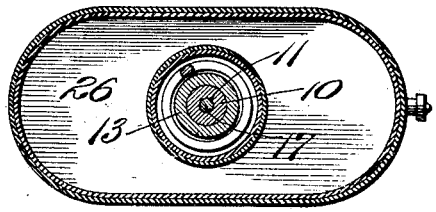

F. G. KOEHLER.
SHOCK ABSORBER FOR VEHICLES.
APPLICATION FILED JULY 18, 1907.
944,674.
Patented Dec. 28, 1909.
3 SHEETS—SHEET 3.
FIG. VI.
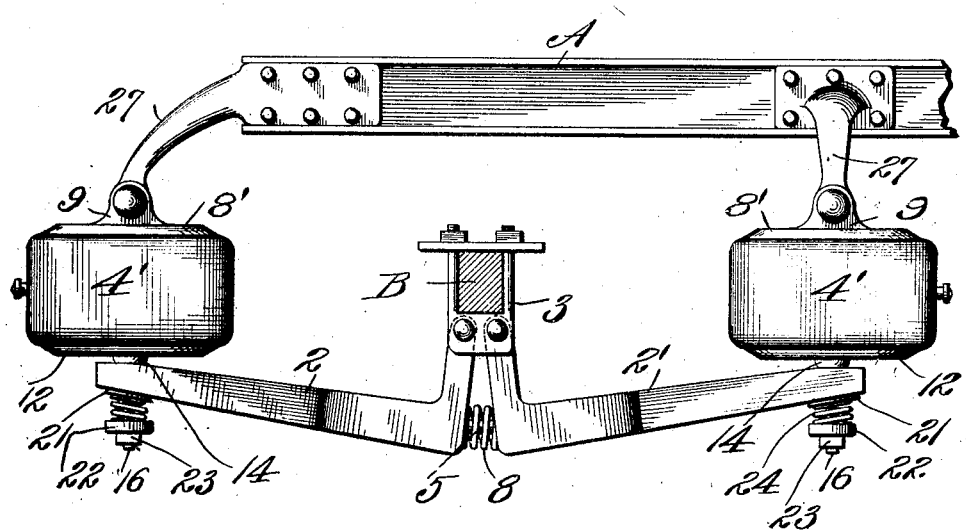
ATTEST.
H. J. Fletcher.
INVENTOR.
F. G. Koehler,
BY
ATT'Y.

UNITED STATES PATENT OFFICE.

FRANK G. KOEHLER, OF ST. LOUIS, MISSOURI.

SHOCK-ABSORBER FOR VEHICLES.

944,674.  Specification of Letters Patent.  Patented Dec. 28, 1909.

Application filed July 18, 1907. Serial No. 384,384.

*To all whom it may concern:*

Be it known that I, FRANK G. KOEHLER, a citizen of the United States of America, residing at the city of St. Louis, in the State of Missouri, have invented certain new and useful Improvements in Shock-Absorbers for Vehicles, of which the following is a full, clear, and exact description, reference being had to the accompanying drawings, forming part of this specification.

My invention relates to a new and useful improvement in shock absorbers for motor or other vehicles, and has for its object to produce a device of this character which will be adequately resilient, simple in construction, hence unlikely to become out of order, and inexpensive to manufacture.

Figure I is a side elevation of a vehicle running gear with my improvement applied thereto. Fig. II is a plan view of the parts shown in Fig. I. Fig. III is an enlarged side elevation of one end of a vehicle running gear, and a section of my improvement. Fig. IV is a vertical section taken on the line IV—IV, Fig. III. Fig. V is a horizontal section taken on line V—V, Fig. III. Fig. VI is a side elevation of one end of a vehicle running gear with a modified form of my improvement applied thereto.

A designates the main frame and B the axles of a vehicle running gear which running gear, as is common, includes two axles and four wheels, but in the following I will confine my description to but one axle and the associated parts which go to make up my invention.

1 designates a semi-elliptic spring fastened to the main frame of the vehicle and 2 and 2′ bell crank levers pivotally connected by suitable means to the axle, such as by attachment to shackles or brackets 3 secured to the axle. Each bell crank lever 2—2′ comprises a main horizontal arm that has connection at its outer end with the main spring or vehicle frame carried member 1 and a vertical arm, the vertical arm of each lever being the member of the lever that has pivotal connection with the axle B.

5 designates a rod extending through alined perforations 6—6′ in the bell crank levers 2—2′, respectively, in the elbows of the bell crank levers. This rod has mounted upon it take-up springs 7 and 7′ located exteriorly of the elbows of the bell crank levers and a compression cushion spring 8 located between the elbows of the levers. The compression cushion spring is of greater strength than the take-up springs and serves as load carrying member, while the weaker take-up springs serve to prevent sudden rebound of the bell crank levers after the cushion spring has been compressed upon downward movement of the main arms of the bell crank levers. The cushion spring 8 is caused to perform its office in connection with the bell crank levers to prevent shock to the vehicle frame in which my shock absorber is used by reason of the main arms of the bell crank levers being connected to the vehicle frame in a suitable manner, such as that to be hereinafter set forth.

I will next proceed to a description of the parts of my shock absorber interposed between the main spring or frame carried member 1 and the main arms of the bell crank levers 2—2′.

4 designates pneumatic springs or cushioning devices that are interposed between the outer ends of the main horizontal arms of the bell crank levers and the main springs or frame carried members 1. The pneumatic cushioning devices 4, of which there are two to each main spring 1, are analogous; hence I will describe in detail but one of them which consists of an upper plate 8′ provided with perforated ears or lugs 9 to which is pivotally connected one end of the main spring 1. This upper plate 8′ is provided with an integral, centrally arranged, depending portion 9′ having a cylindrically shaped lower end 10, said upper plate 8′ and its members 9′ and 10 being provided with a vertically arranged bore 11 for a purpose about to be described.

12 designates a lower plate having an upwardly extending portion 13, and a depending, semi-spherical portion 14, said upwardly extending portion 13 being provided with a cylindrical bore 15 which receives the cylindrical portion 10 of the upper plate 8′. The elements 12, 13, and 14 are also provided with a vertically arranged bore 16 which is in alinement with the bore 11 of the upper plate 8′.

17 designates a bolt which passes through the bores 11 and 16 and through an orifice 17′ formed in the outer end of the lever 2′. This orifice 17′ is formed by upper and lower semi-spherical recesses 18 and 19 respectively, said semi-spherical recesses being connected by a conically-shaped bore 20, the recesses 18 receiving the semi-spherical portion 14 of the lower plate 12, while the recess 19 is designed to receive a complementary shaped washer 21 arranged on the bolt 17.

22 indicates a cup shaped washer which is arranged upon the lower end of the bolt 17, and is adjustably held thereon by means of a nut 23, and arranged between this washer and the washers 21 is a take-up spring 24 that serves to prevent sudden rebound of the parts located between the main spring and the lever 2.

25 designates an expansible coiled spring which is interposed between the plates 8' and 12 and surrounds their respective portions 9' and 13. The office of this spring is to provide a guard for a pneumatic cushion, to be hereinafter described, which surrounds it, so that the flexible walls of said pneumatic cushion will not become impinged between and mutilated by the shoulders of the extensions 9' and 13 of the plates 8' and 12, respectively, which act as stops in the event of collapse of the pneumatic cushion.

26 designates a pneumatic cushion, or spring, of flexible material which surrounds the coiled springs 25 and is located between the plates 8' and 12. I prefer to make the plates 8' and 12 and the pneumatic cushion approximately of elliptic shape, and to arrange them upon the vehicle that their longest dimensions are longitudinally disposed relative to the vehicle in order that the desired resiliency may be obtained without taking up too much room laterally of the vehicle.

In Fig. VI of the drawings I have shown a slightly modified form of the invention, wherein I have dispensed with the use of the semi-elliptic springs and have connected the upper end of the pneumatic cushions 4' directly to the frame of the vehicle by means of brackets 27. This structure may be effectively utilized in the lighter type of vehicles.

I claim as my invention:

1. The combination with a vehicle frame and an axle, of a shock absorber comprising a pair of bell crank levers, each having an inner arm pivotally connected to and depending from said axle and an arm extending laterally from the lower end of the inner arm and pivotally connected to said vehicle frame, and a compression spring located between said inner arms.

2. The combination of an axle, a pair of bell crank levers having inner and outer arms, means mounted upon the axle and pivotally connected to said inner arms, and springs located between and on each side of the elbows of said bell crank levers.

3. The combination of an axle, a pair of bell crank levers having inner and outer arms, means mounted upon the axle and pivotally connected to said inner arms, a bolt passing through said inner arms, and springs mounted upon the bolt between and on each side of the elbows of said bell crank levers.

4. In a shock absorber for vehicles, the combination of a body, an axle, a pair of bell crank levers having pivotal connection to the under side of the axle, a connection between the outer ends of the levers and the vehicle body, a compression spring located between the elbows of the levers, take-up springs located outside of the elbows of the levers, and a rod passing through said springs and through the elbows of the levers and having nuts on its outer ends, substantially as set forth.

5. In a vehicle the combination with an axle and frame, of a pair of levers pivotally supported by said axle, resilient means interposed between said levers, pneumatic means carried by the free ends of said levers, and means for connecting said pneumatic means to said frame, substantially as described.

6. In a vehicle the combination with an axle and frame, of levers pivotally supported by said axle, resilient means interposed between said levers, coiled springs carried by the free ends of said levers, and means connecting said coiled springs to said frame, substantially as described.

7. In a vehicle the combination with an axle and frame, of levers pivotally supported by said axle, resilient means interposed between said levers, coiled springs and pneumatic cushions carried by the free ends of said levers, and means for connecting said coiled springs and pneumatic cushions to said frame, substantially as described.

8. In a vehicle the combination with an axle and frame, of levers pivotally supported by said axle, resilient means interposed between said levers, a plate having a universal joint connection with, and carried by the free end of, said levers, resilient means carried by said plate, and means connecting said resilient means to said frame, substantially as described.

9. In a vehicle the combination with an axle and frame, of levers pivotally connected to said axle, resilient means interposed between said levers, telescopic members carried by the free ends of said levers, resilient means interposed between said telescopic members, one of said telescopic members having a universal joint connection to the free ends of said levers, and the other of said telescopic members having means for connecting it to said frame, substantially as described.

10. In a vehicle the combination with an axle and frame, of levers pivotally connected to said axle, a spring interposed between said levers, springs coöperating with said levers to exert a pressure in an opposite direction to that of the first mentioned spring, resilient means carried by the free ends of said levers, and means for connecting said resilient means to said frame, substantially as described.

11. In a vehicle the combination with an axle and frame, of levers pivotally connected to said axle, resilient means coöperating with said levers near their fulcrum points, telescopic means carried by the free ends of said levers, one of said telescopic members having a loose joint connection with said levers, means connecting the other of said telescopic members to said frame, resilient means interposed between said telescopic members, bolts passing through said telescopic members and the free ends of said levers, washers loosely carried by said bolts and arranged below the free ends of said levers, a second washer carried by each bolt, and springs interposed between said washers, substantially as described.

FRANK G. KOEHLER.

In the presence of—
WM. H. SCOTT,
LILY ROST.